United States Patent [19]
Watanabe et al.

[11] Patent Number: 6,075,240
[45] Date of Patent: Jun. 13, 2000

[54] HAND-HELD PLASTIC OPTICAL FIBER LINEAR SCANNER FOR READING COLOR IMAGES FORMED ON A SURFACE

[75] Inventors: Kojiro Watanabe, Cranbury; Ting Wang, Princeton, both of N.J.; Ichiro Fujieda, Kanagawa, Japan; Yao Li, Monmouth Jct.; Allan Schweitzer, Plainsboro, both of N.J.

[73] Assignee: NEC USA, Inc., Princeton, N.J.

[21] Appl. No.: 09/124,832

[22] Filed: Jul. 30, 1998

[51] Int. Cl.$^7$ ........................................... H01J 3/14
[52] U.S. Cl. .................. 250/234; 250/208.1; 250/566; 250/231.18; 358/473
[58] Field of Search ..................... 250/234, 235, 250/566, 208.1, 227.11, 227.2, 227.26, 231.18, 237.14; 235/472.01, 472.02, 472.03, 462.45; 382/313; 358/473, 474, 484

[56] References Cited

U.S. PATENT DOCUMENTS

| | | |
|---|---|---|
| 3,610,891 | 10/1971 | Raciazek . |
| 3,711,723 | 1/1973 | McMurtry . |
| 3,784,794 | 1/1974 | Allais . |
| 3,786,181 | 1/1974 | Pear, Jr. . |
| 3,869,599 | 3/1975 | Sansone . |
| 3,870,396 | 3/1975 | Racki et al. . |
| 4,011,007 | 3/1977 | Phaneuf et al. . |
| 4,467,196 | 8/1984 | Balliet et al. . |
| 4,702,552 | 10/1987 | Margolin . |
| 4,748,680 | 5/1988 | Margolin . |
| 4,760,421 | 7/1988 | Margolin . |
| 4,847,490 | 7/1989 | Nishikama . |
| 4,978,850 | 12/1990 | Nakamura et al. . |
| 5,015,064 | 5/1991 | Detig et al. . |
| 5,023,725 | 6/1991 | McCutchen ..................... 358/231 |
| 5,061,036 | 10/1991 | Gordon . |
| 5,074,641 | 12/1991 | Nakai et al. . |
| 5,121,459 | 6/1992 | Chiang . |
| 5,159,656 | 10/1992 | Goldstein . |
| 5,258,858 | 11/1993 | Chow . |
| 5,367,596 | 11/1994 | Chow . |
| 5,673,344 | 9/1997 | Li et al. . |

OTHER PUBLICATIONS

Compact Imaging Apparatus for a Pen–Shaped Hand–Held Scanner, by Haga, Fujieda and Okumura, in Proceedings of the SPIE, International Society for Optical Engineering, vol. 3019, pp. 168–173, Feb. 1997.

I. Sawaki, M. Miura, Y, Y. Ishikawa and F. Abe, "High–contrast off–axis imaging system using binary lens array," extended abstract presented at Japan Optics '95, Tokyo, Sep. 20–22, 1995, pp. 43–44 (in Japaneses).

Ichiro Fujieda, Hiroshi Haga, Fujio Okumura, Yasuyoshi Matsumoto, Hiroshi Kohashi, Hiroshi Matsuo and Shigeki Miura, "Color pen–shaped scanner," Proc. IS&T/SID, Fifth Color Imaging Conf., Scottsdale Arizona, Nov. 17–20, 1997, pp. 131–135.

Tadahiko Hamaguchi, Hiromi Yamashita, Akira Ohta, Toshio Matsumoto and Masayuki Saito, "Contact–type color image sensor using three LED switching method", Proc SPIE vol. 3019, pp. 147–153, Apr. 1997.

Hiroshi Haga, Ichiro Fujieda, Fujio Okumura, "Compact imaging apparatus for a pen–shaped hand–held scanner", Proc SPIE vol. 3019, pp. 168–173, Apr. 1997.

(List continued on next page.)

*Primary Examiner*—Que T. Le
*Attorney, Agent, or Firm*—Sughrue, Mion, Zinn, Macpeak & Seas, PLLC

[57] ABSTRACT

A hand-held optical scanner for reading color images formed on a document. The scanner head is all-optical and contains no electronics. Optical fiber bundles couple the scanner head to a remote opto-electronic module containing a linear or a 2D sensor array for converting optical signals, reflected from the document, to electrical signals for transmission to a computer display, etc. By using side coupling, the transmitted and reflected light for each pixel travels through the same optical fiber without the need for a beam splitter. The optical fibers are used for the functions of image scanning, position encoding, and signaling a computer which assigns each one of incoherently arranged optical fibers to one of the functions.

14 Claims, 18 Drawing Sheets

OTHER PUBLICATIONS

R.A. Street, R.L. Weisfield, S.E. Nelson, R. Chang, "Page-sized amorphous silicon image sensor arrays", Proc SPIE vol. 1900, pp. 135–146, Jul. 1993.

Shuji Nakamura, Masayuki Senoh, Naruhito Iwasa, Shin–ichi Nagahama, Takao Yamada and Takashi Mukai, Superbright Green InGaN Single–Quantum–Well–Structure Ligh–Emitting Diodes, Jpn. J. Appl. Phys. vol. 34, Oct. 1995, pp. 1332–1335.

Shuji Nakamura, Takashi Mukai, Masayuki Senoh, "Canada–class high–brightnes InGaN/AlGaN double–heterostructure blue–light–emitting diodes" Appl. Phys. Lett., vol. 64, Mar. 1994, pp. 1687–1689.

Ichiro Fujieda and Hiroshi Haga, "Fingerprint input based on scattered–light detection", Applied Optics, vol. 36, Dec. 1997, pp. 9152–9156.

Eietsu Takahasi, Shigeo Tanji, Akira Tanaka and Yuji Hayashi, "Current Developments in Optical Design and Optical Engineering", Proc. SPIE, vol. 1527, Jul. 1991, pp. 145–154.

Tetsuroh Nakamura, Eiichiroh Tanaka, Shinji Fujiwara, "Processing and Packaging of Semiconductor Lasers and Optoelectronic Devices", Proc. SPIE, vol. 1851, Jan. 1993, pp. 151–161.

Kenji Sera, Fujio Okumura, Hiroyuki Uchida, Shinji Itoh, Setsuo Kaneko and Kazuaki Hotta, "High–Performance TFT's Fabricated by XeCl Excimer Laser Annealing of Hydrogenated Amorphous–Silicon Film", IEEE Trans. on Electron Dev., vol. 36, Dec. 1989, pp. 2868–2872.

Kazumi Komiya and Narinobu satoh, "A Contact–Type Full–Color Reading System Using Three–Color Solid State Illuminators", Proc. SPIE, vol. 2415, Feb. 1995, pp. 165–170.

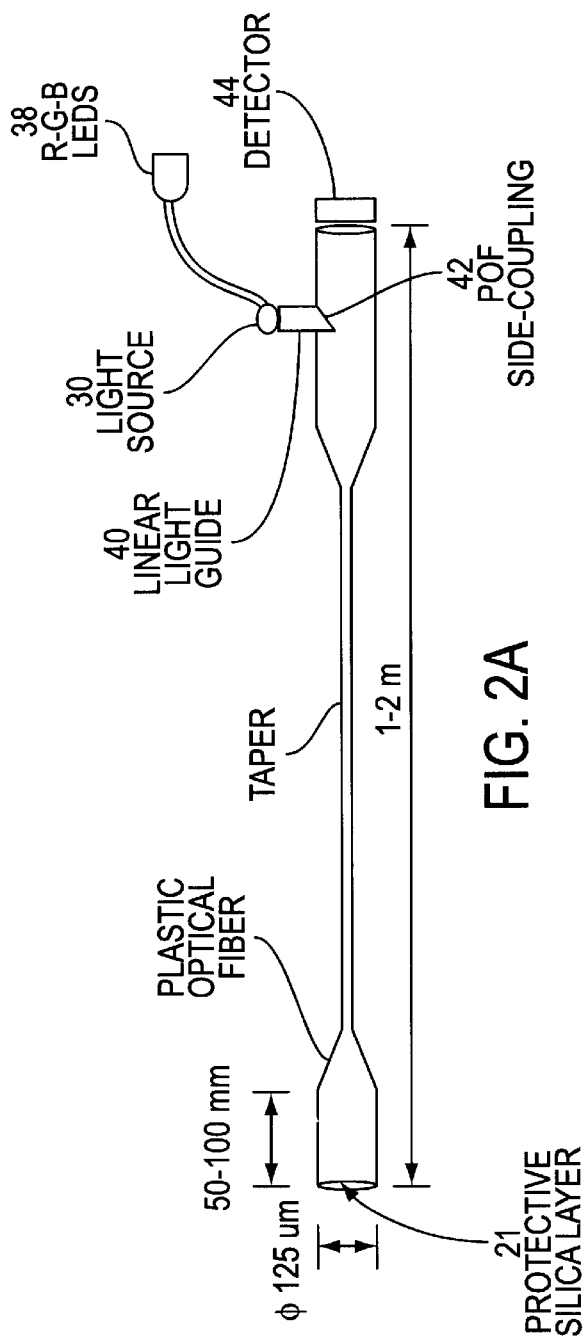
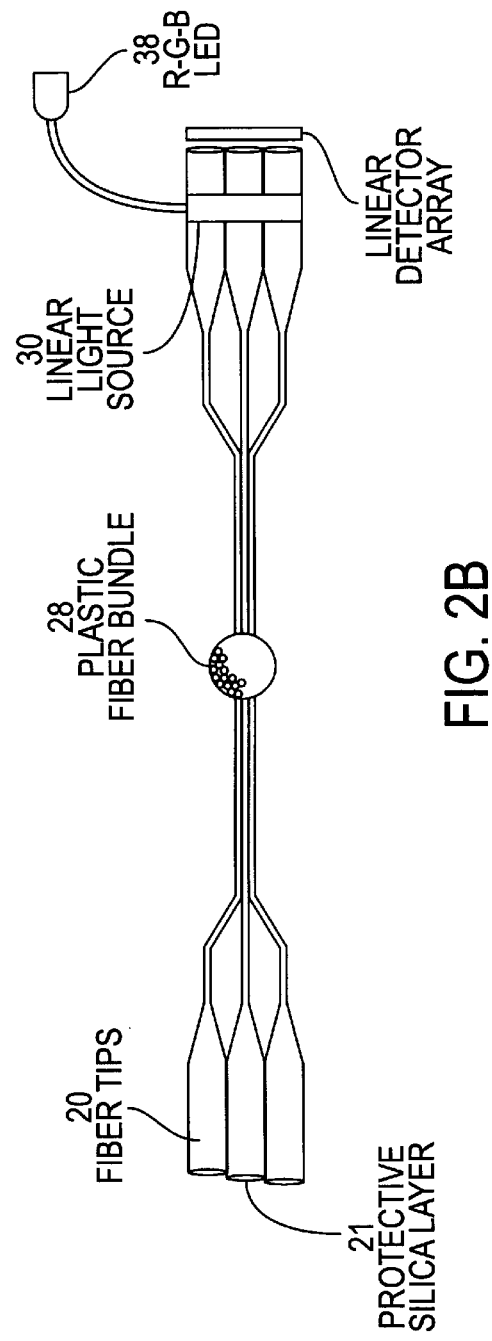
FIG. 2A
FIG. 2B

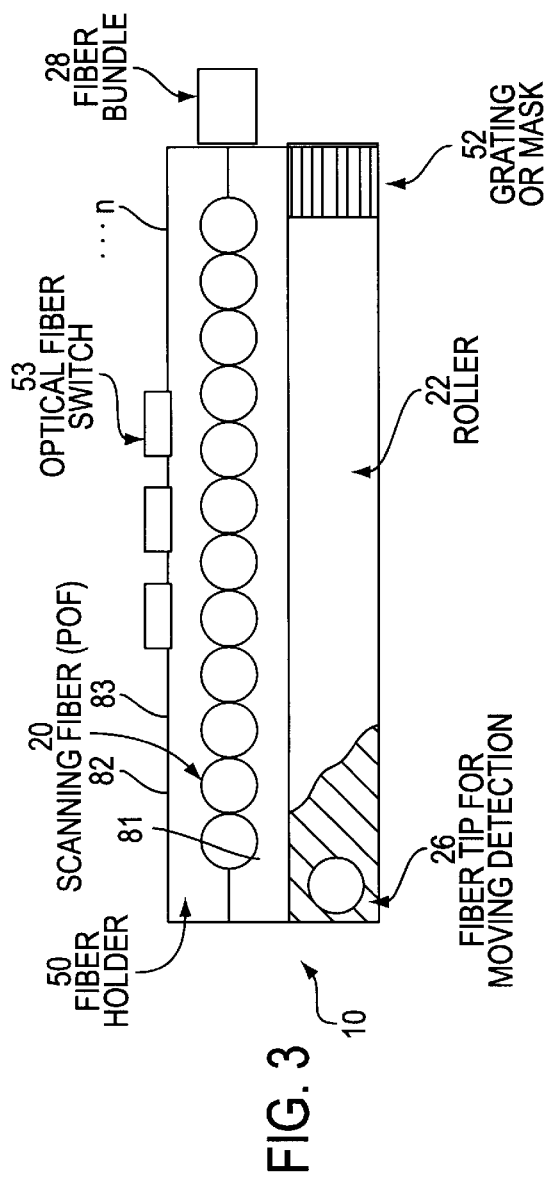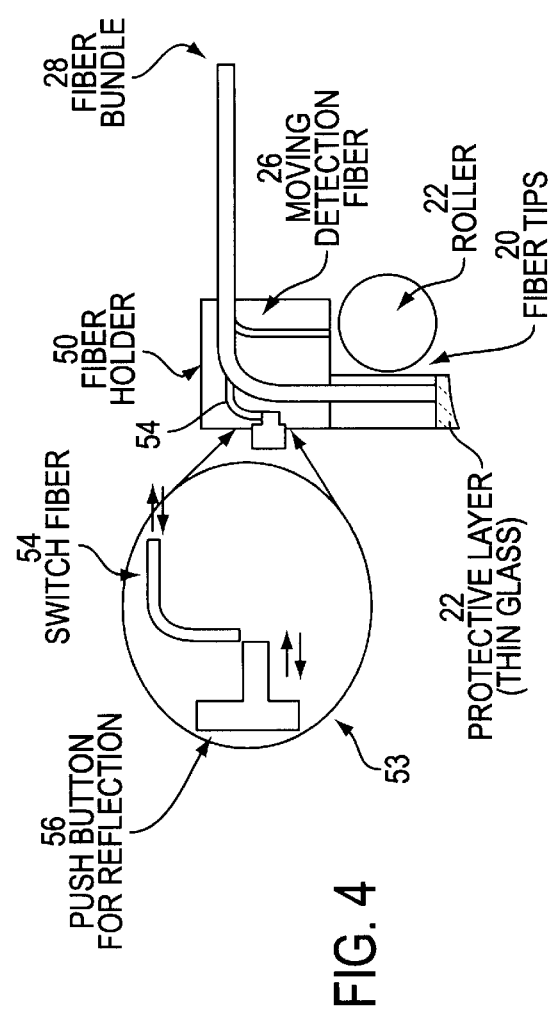

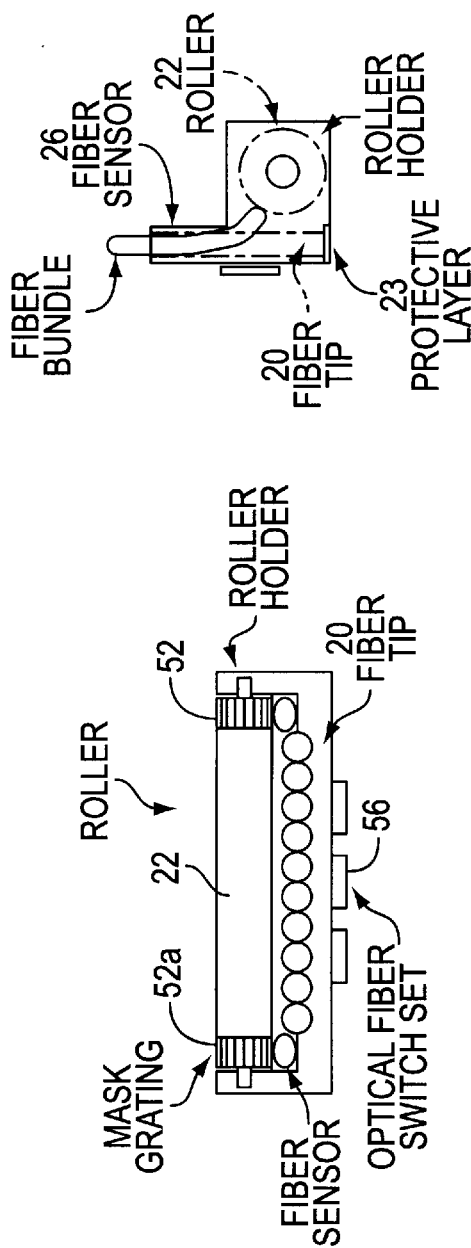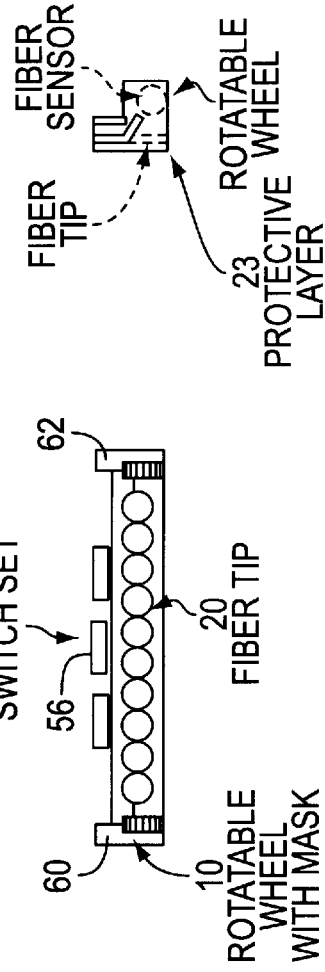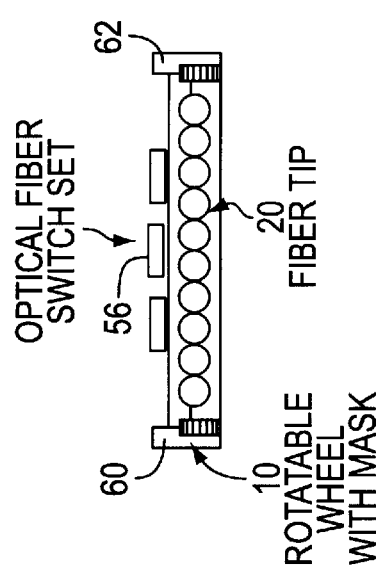

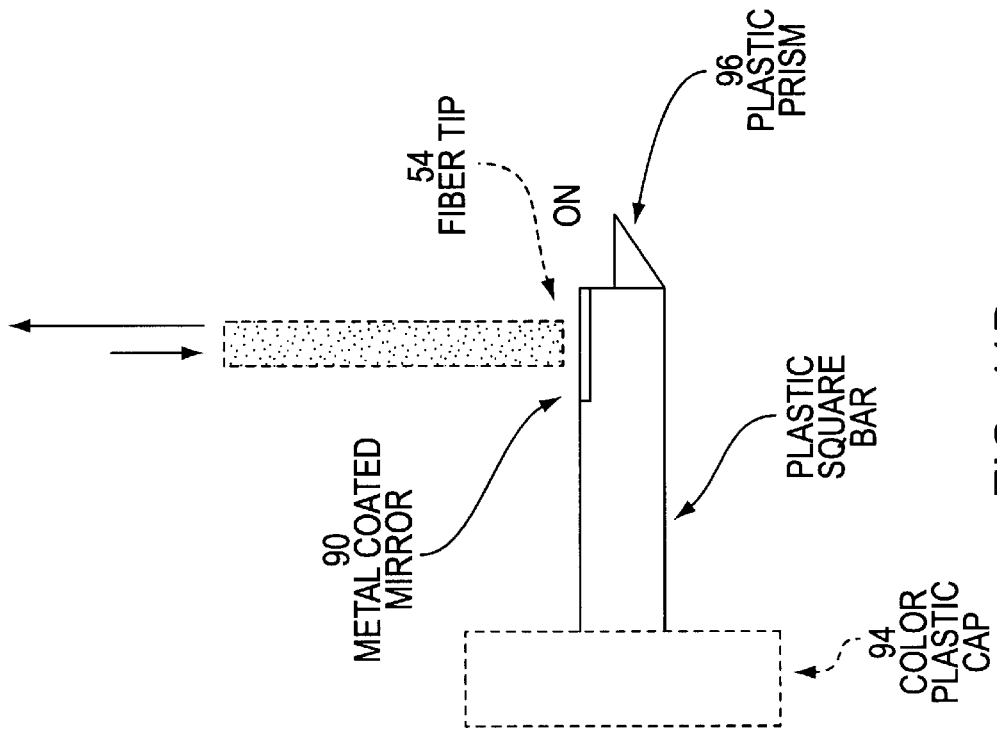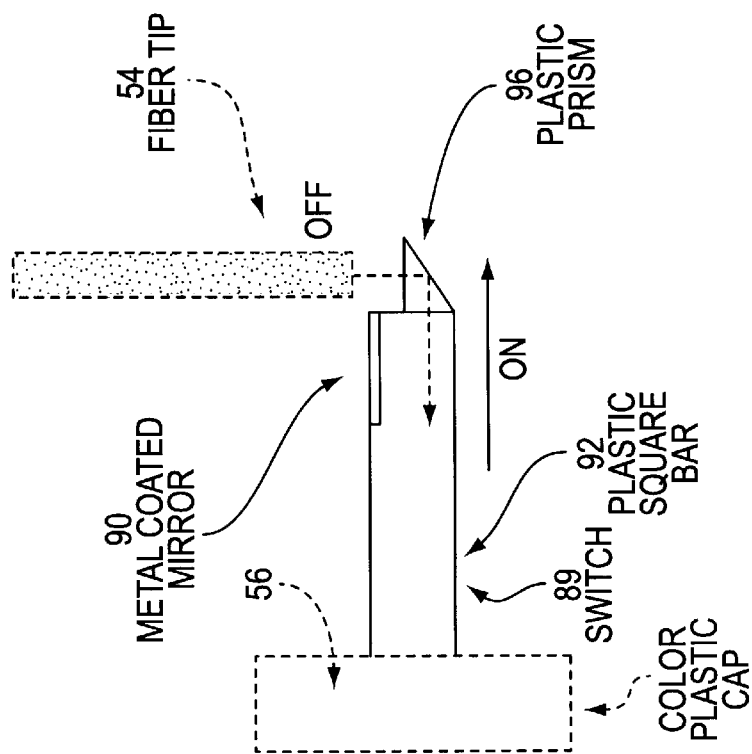

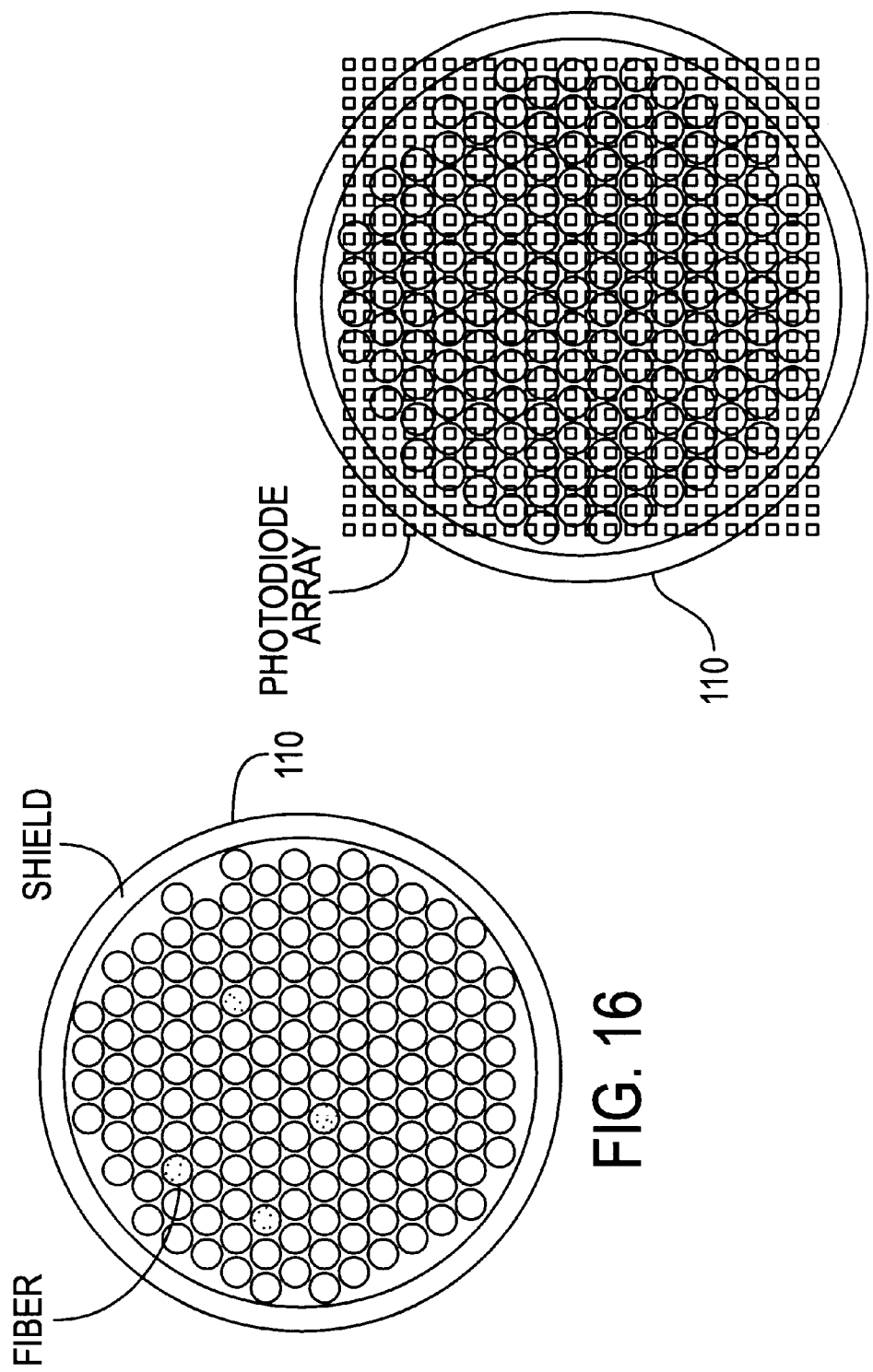

HAND-HELD PLASTIC OPTICAL FIBER LINEAR SCANNER FOR READING COLOR IMAGES FORMED ON A SURFACE

BACKGROUND OF THE INVENTION

This invention relates to the field of optical fiber image scanners and more particularly to a hand-held plastic optical fiber scanner which contains no electric circuits within the scanner head and which is compact, which provides higher contrast ratio and scanning resolution, which increases scanning speed and which reduces the power required for illumination of the image being scanned.

Optical fiber scanners, per se, are well known. For example, U.S. Pat. No. 4,467,196 discloses a hand-held pen-shaped single fiber optical scanner for reading a bar code which is scanned by transmitted single wavelength pulses which are reflected back through the same single fiber. The frequency and spacing of the transmitted light pulses, and the spacing of the code bars, are chosen such that the pulses reflected from the bar code occur between the transmitted light pulses; however, the scanner is capable of detecting only the transitions or edges of the code bars, requires a beam splitter and does not have a color scan capability, i.e., it can provide only black and white ("1"and "0") signals with no gray levels.

A pen-shaped hand-held optical scanner with a rotary displacement encoder is disclosed in an article titled, "Compact Imaging Apparatus for a Pen-Shaped Hand-Held Scanner", by Haga, Fujieda and Okumura, in Proceedings of the SPIE, International Society for Optical Engineering, Vol. 3019, pp. 168–173, February 1997.

The following U.S. patents further show the state of the prior art of optical scanners:

U.S. Pat. Nos. 3,610,891: 3,784,794; 3,786,181; 3,869,599; 3,870,396; 4,011,007; 4,748,680; 4,702,552; 4,760,421; 4,847,490; 4,978,850; 5,015,064; 5,061,036; 5,074,641; 5,121,459; 5,159,656; 5,159,576; 5,258,858; 5,367,596; and 5,673,344.

The disclosures of all of the above-cited patents and publication are expressly incorporated herein by reference.

SUMMARY OF THE INVENTION

Thus, the broad object of the invention is to provide a modular hand-held plastic optical fiber linear scanner containing an all-optical fiber scanner head which, itself, contains no electronics, and which optically communicates with a remote opto-electronic (photosensor) module which, for example, can be miniaturized and integrated onto a computer motherboard or PCMCIA (Personal Computer Memory Card International Association) card-type device. The optical fiber scanner is particularly useful as an input device for notebook computers, hand-held computers, and personal communication systems (PCS).

A more specific object of the invention is to provide an optical fiber scanner head consisting of a bundle of plastic optical fibers which combine the functions of illumination and detection within the same fiber to eliminate the need for electronic devices within the scanning head, per se, and containing only optical, rather than electronic, means to measure position and orientation of the scanner head. The all-optical scanning head contains the elements necessary for integrating the scanning, position-encoding and switching functions in a single all-optical unit.

Another object is to provide an optical fiber scanner which employs three (Red, Green, Blue) light sources, and which uses on a time-share basis a single optical fiber for scanning the red (R), green (G) and blue (B) color components of a pixel in a color image, and to use one sequentially activated opto-electronic sensor for detecting the three colors.

Another object is to provide the opto-electronic sensors as a linear (1D) or 2D array of CCDs, or as multi-apertured photodiodes on a transparent glass substrate, wherein the array senses all of the scanning, switching and position-encoding functions.

Another more specific object is the provision of tapered plastic optical fibers which reduce the size of the connection between the optical fiber scanner head and the opto-electronics driver in the module, thereby providing greater flexibility and reliability of the fiber bundle formed by the optical fibers.

Another object is to provide such an optical scanner head with an all-optical position encoder and a fiber switch which allows the position-encoding and switching functions to use the same opto-electronic sensors (e.g., a single CCD chip) as are used for the image-scanning function (as compared to prior art scanners which require separate detectors for the image-sensing and position-encoding functions, respectively), and with a computer for assigning to any sensor an optical fiber associated with any one of these three functions.

Another specific object is to use a side coupling through which light is emitted from an optical fiber (see U.S. Pat. No. 5,673,344), thereby eliminating the need for a beam splitter, increasing the coupling efficiency, and reducing the size and thickness of the opto-electronic module.

The unique modular all-optical design of the scanner head has several advantages. The all-optical scanner head is separated from the opto-electronic driver module, and the scanner head per se is very compact and has fewer components and, thus, high reliability and low production cost. The opto-electronics module can be easily integrated into a computer system (for example, onto a main motherboard). Further, the separated opto-electronics module is removed from undesirable environments (e.g., moisture) that do not affect the all-optical scanner head which, for example, can operate on a wet image medium or operate even under water. Furthermore, each module (scanner head, fiber bundle and opto-electronics driver) may be detached and separately replaced in the event of a malfunction. Use of the side coupling for emitted light minimizes the size and complexity of the opto-electronics module, and enables the module to be implemented within the dimensional constraints of the PCMCIA card-type format. Furthermore, the all-optical construction of the scanner head makes it immune to EMI (electro-magnetic interference).

A further object of the invention is to provide an optical scanning system employing a hand-held all-optical scanner head and a remote opto-electronics module such that, for example, characters and other images in color on a document can be efficiently and accurately scanned by the all-optical scanner head, the optical (light) signals reflected from the document being transmitted via the optical fibers to the remote opto-electronics module which converts the optical signals to electrical signals that are transmitted, for example, to a computer to enable reading of the scanned image.

Another object is to eliminate the need for coherent alignment between the opposite ends of the fibers in a bundle and to maintain the original pixel arrangement of the image being scanned, by providing a calibration procedure which (1) makes a one time determination of the locations of the fiber ends in the scanner head array, and (2) determines the correspondence between each individual fiber in the bundle and the maximally responsive photosensor (CCD) pixel in the photosensor array.

BRIEF DESCRIPTION OF THE DRAWING

FIG. 2a illustrates a single tapered optical fiber having a side coupling;

FIG. 2b is showing the tips of a plurality of optical fibers arranged in a linear array in the scanner head;

FIG. 3 is a longitudinal cross-sectional view of the optical fiber scanner head;

FIG. 4 is a transverse cross-sectional view of the scanner head of FIG. 3;

FIG. 6a is a bottom view of the scanner head;

FIG. 6b is a side view of FIG. 6a;

FIG. 7a is a simplified bottom view of the scanner head;

FIG. 7b is a side view of FIG. 6;

FIGS. 11a to 11c are schematic diagrams of the structure of a preferred optical fiber switch;

FIG. 16 is a cross section of the optical fiber bundle;

FIG. 17 is a plan view illustrating the spatial positioning of the fibers and the 2D array of photodiodes.

DESCRIPTION OF PREFERRED EMBODIMENTS

Figure 1:
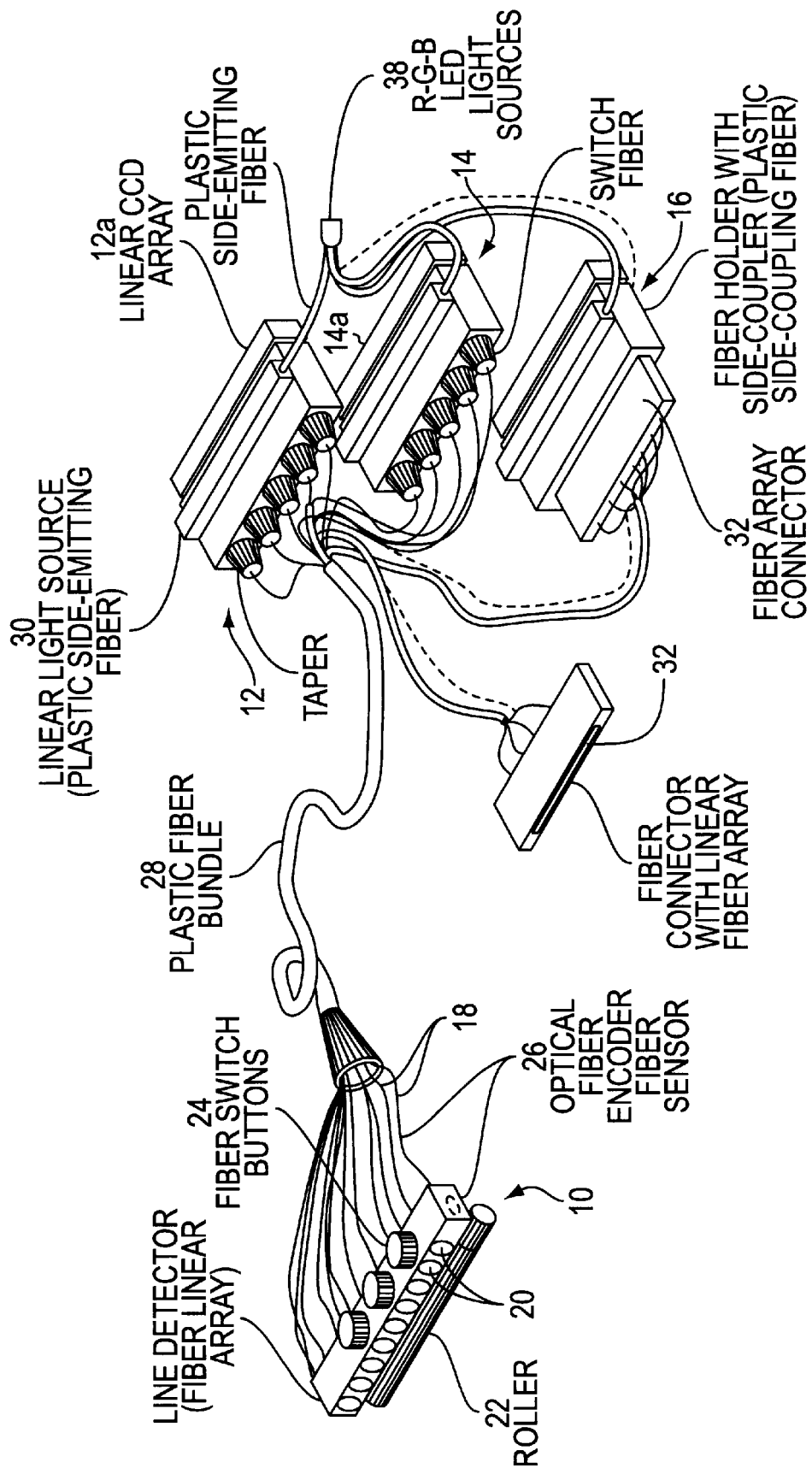
FIG. 1 is a schematic perspective view of an embodiment of the invention including an all-optical scanner head and separate opto-electronic modules.

FIG. 1 is a schematic perspective view of a preferred embodiment of an overall system employing an all-optical hand-held scanner head 10 (made of injection molded plastic) and opto-electronic modules 12 and 14. The plastic optical fibers 18 pass through the scanner head 10 and terminate in optical fiber tips 20 to form a linear array of optical fiber tips. Mounted in the scanner head 10 is a roller 22. Also mounted in the head are fiber optical switch buttons 24 and an optical fiber position encoder 26.

In use, the scanner head 10 is placed onto the image (such as a printed document) to be scanned and then moved by hand to cause the fiber array 20 to pass across the image in order to scan or digitize the object. Roller 22, fiber optical switches 24 and optical position encoder 26 measure translation or displacement of the scanner head 10 during a scanning operation.

The individual plastic optical fibers from the scan head 10 are collected into a flexible plastic fiber bundle 28 for connection to the opto-electronic modules 12 and 14. Each scanning position along a linear detector array corresponds to only a single one of the optical fibers 18 in the bundle 28. Each optical fiber will transmit light, provided by the time-shared linear light source 30, to a corresponding pixel location in the linear array 20 of the optical fiber tips in the scanner head 10. Each fiber also returns reflected light from the pixel image to a photodetector array 12a/14a which is located in each of the modules 12/14 and which converts the reflected light signals to electrical signals for use, for example, in a computer or other device that converts the electric signals to human-readable form. The photodetector array may comprise CCDs or polycrystalline silicon detectors.

Use of a light-emitting side-coupling in each plastic optical fiber (described in more detail below) allows the opto-electronic components 12 and 14 to be packaged into very small modules. Modular design of the opto-electronic requirements facilitates implementation of a high-resolution scanner which may incorporate a large number of individual fibers, and thus may require the use of two or more opto-electronic modules. FIG. 1 also illustrates an optional fiber array connector 32 which can be plugged into an optional electronic module 16, thereby allowing the scanner easily to be separated into individual components (scanner head, fiber bundle, and opto-electric driver module). This modular design, with the ability to disconnect individual modules, provides several advantages: the electro-optical driving unit can be integrated with a computer system or onto the motherboard thereof; the scanner head 10 may be replaced with one providing greater resolution, working area or shape; the scanner head may be replaced with an optical imaging (lens) module for real-time video capture; and the imaging module may be assembled and aligned independently of the assembly and alignment of the electro-optical module or scanner head.

One of the plastic optical fibers is illustrated in FIG. 2a. The nominal fiber diameter at the scanner head is 125 $\mu$m, providing (in this example) a resolution of 8 lines per mm. Each fiber is drawn or tapered to a smaller diameter within the bundle 28. Flexibility of the optical fiber bundle is enhanced by tapering the fibers as shown. For example, a scanner head with a scan length of 100 mm and an element pitch of 125 $\mu$m will require a bundle of 800 fibers and will provide a scanner resolution of 200 dots-per-inch (dpi). The maximum attenuation of the fiber bundle is approximately 0.2 dB/m. Also, suitable is optical fiber CK-5 which is available from Mitsubishi Rayon Co. and has a diameter of 114 $\mu$m with a resolution of 203 dpi. Using fibers with a midsection diameter of 50 $\mu$m will require an overall bundle diameter, including jacket, of less than 3 mm (1.4 mm for the fiber bundle).

Light from three individual (red, green, blue) LED light sources 38, forming the light source 30, is introduced into each fiber 18 via a light guide 40 and a plastic optical fiber (POF) side-coupler 42. Light which is back-scattered from the image returns via the same fiber 18 to an individual photodetector (e.g., CCD) element 44. The overall length of each optical fiber is limited only by the attenuation of the fiber, and is typically 1 to 2 meters, but may be as great as 10 meters or more.

FIG. 2b shows a top view of the scanner. Individual image scanning fiber tips 20 are arranged in the linear array in the scanner head 10. The fibers 18 are collected into the plastic fiber bundle 28. Since the fiber tips 20 engage the document being scanned, they are coated with a 12 micron thick protective coating 21 of silica which is formed by any conventional chemical deposition process. It is immaterial whether individual fibers are arranged in a coherent or random manner. The location of each fiber in the linear array in the scanner head is determined once, following manufacture of the scanner head, by a calibration procedure described below. The linear light source 30 may be in the form of a light tube or a side-emitting plastic optical fiber (POF).

FIG. 3 is an enlarged longitudinal sectional view of the scanner head 10. The fiber bundle 28 may enter the scanner head 10 from the side (as illustrated) or from the back (as illustrated in FIGS. 1 and 4). A fiber holder 50 consists of dimensionally stable plastic (to position the fibers 18) opaque material. The roller 22 contacts the surface carrying the image to be scanned. As the scanner head 10 is moved across the image, rotation of the roller 22 rotates an attached grating 52 past the speed- and direction-detecting fiber tip 26, thereby modulating the output of a detector associated with fiber tip 26 to provide a continuous indication of the displacement or translation of the scanner head 10 during the operation.

FIG. 4 is a transverse cross-sectional view of the scanner head 10. The speed and direction detection fiber 26 terminates at the roller encoder grating 52. This fiber 26, together with its associated illumination and photodetectors, is otherwise identical to all other fibers 18 in the bundle 28. A 150 to 300 micron thick protective glass layer is adhered to the fiber tips 20 to protect them from damage when they contact the document being scanned. The same principle of back-reflection through each fiber, used for fiber scanning of the image, is also used for an optical fiber switch 53 which, via its fiber 54 (in bundle 28) and its push button 56, enables the operator to provide an ON/OFF or other mouse-button type optical signal to the control software (not illustrated). The optical fiber switch 53 will be described in more detail in connection with FIG. 11.

Figure 5:
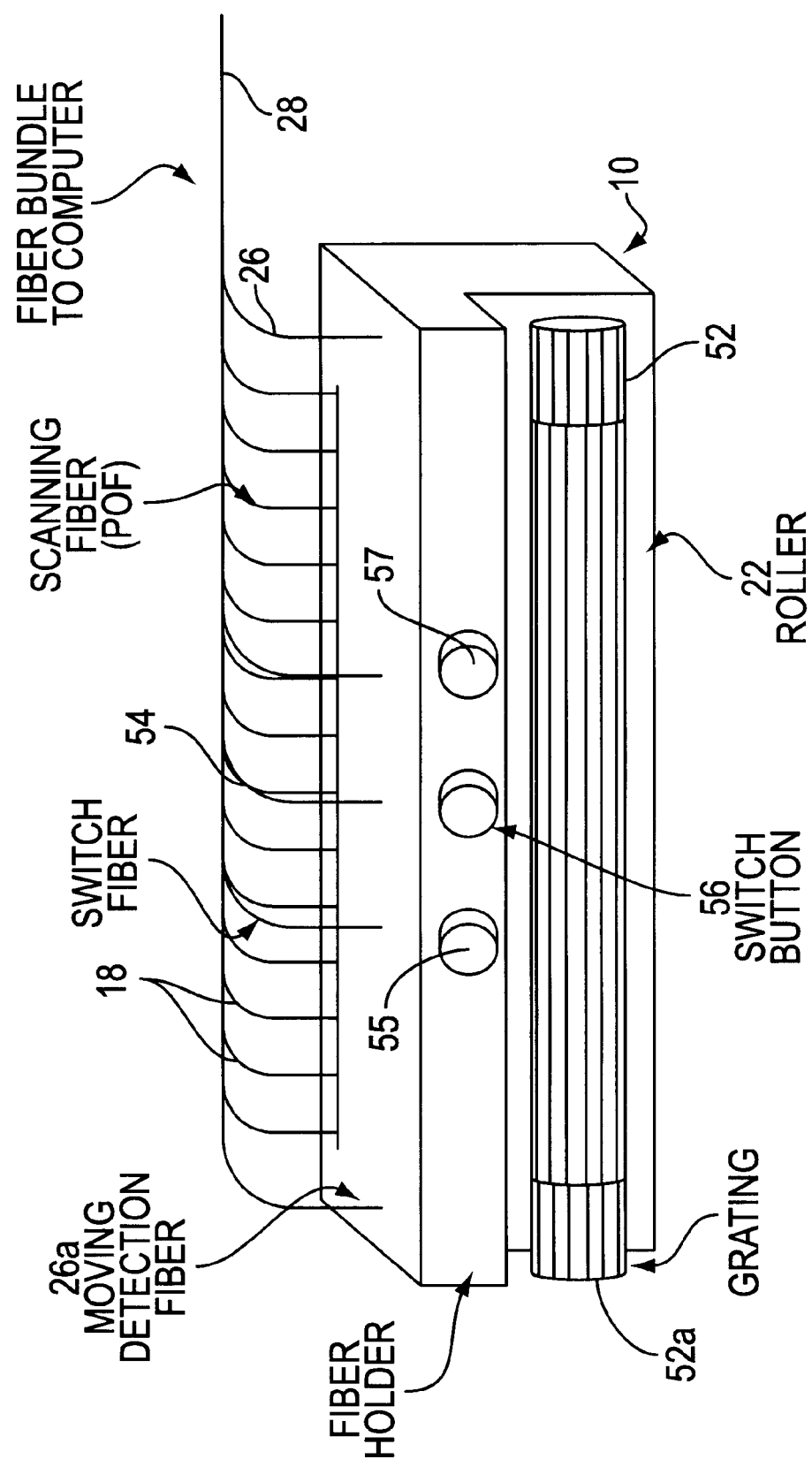
FIG. 5 is a perspective view of a scanner head to which the linear array of optical fibers is coupled.

FIG. 5 is a perspective view of another embodiment of the scanner head 10, and shows the fiber bundle 28 entering the scanner head from the side (it may also enter the scanner head from the rear as indicated in FIG. 1. A second grating 52a is fixed to the left end of the roller 22 and is associated with a second position fiber 26a.

FIGS. 6a and 7a are bottom views of the scanner head 10 and show the fiber tips 20 organized into the linear array which contacts the paper or other object carrying the image to be scanned. Each individual plastic optical fiber 18 illuminates the corresponding point on the page scanned, and also carries the reflected light from the page back to the photodetector corresponding to this single fiber. With a nominal tip diameter of 125 $\mu$m, each fiber tip will have a numerical aperture (NA) of 0.5. Numerical aperture is a measure of the amount of light that can be coupled to an optical fiber. The greater the numerical aperture, the easier it is to connect the light source to the fiber.

Use of the long single (rubber) roller 22 facilitates parallel translation/displacement of the scanner head as it is moved across the page. Alternatively, a segmented roller may be used with encoder masks and associated sensor fibers at opposite ends of the scanner head 10, so that rotation, as well as translation/displacement of the scanner head, can be determined during scanning. In some applications, it may be desirable further to reduce the size of the scanner head 10. As illustrated in FIGS. 7a and 7b, position encoding may be achieved by using small rotatable wheels 60 and 62 at opposite ends, respectively, of the scanner head 10, instead of using the larger roller 22 illustrated in FIG. 6.

Figure 8A:
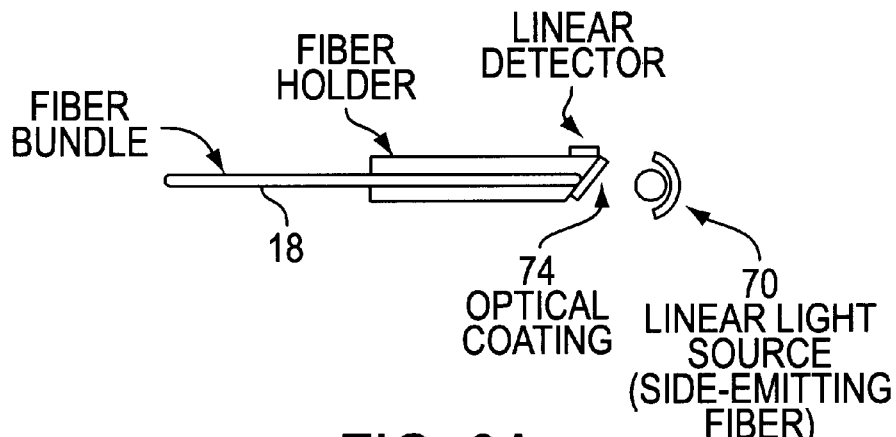
FIGS. 8a, 8b and 8c are longitudinal cross-section views of different forms of the optical fiber bundle.
Figure 8B:
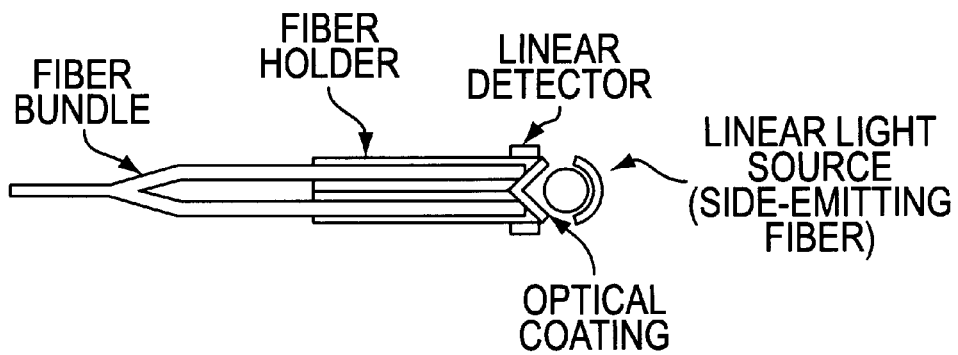
Figure 8C:
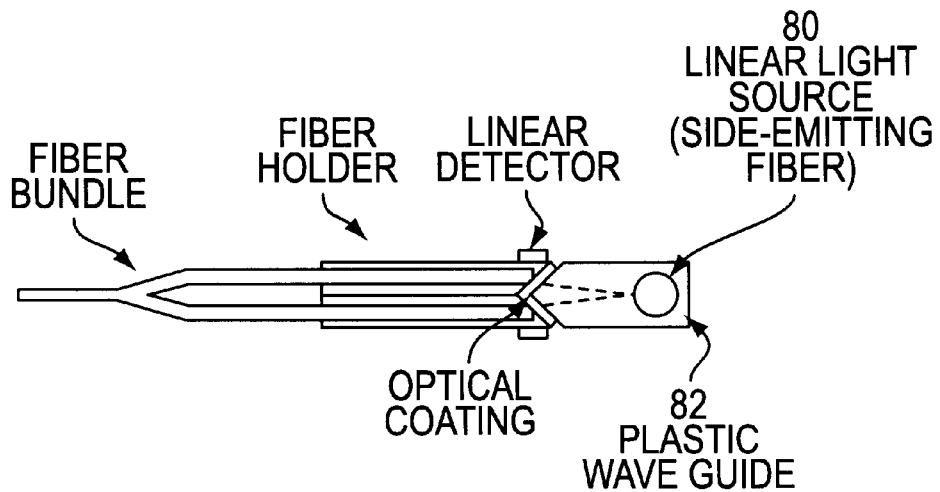

FIGS. 8a, 8b and 8c illustrate alternative cross-sectional views of the optical fiber as it enters the opto-electric module, such as the linear photodiode array. (In FIG. 2, the detector element is illustrated as being in axial alignment with the fiber, and light from a lateral source is coupled into the fiber via a light guide and a notched POF side-coupler. In FIG. 8a, the light source 70 (which may be provided by the three (RGB) LEDs 38) is in axial alignment with the fiber. The linear detector 72, fixed to a fiber 18, receives light returned from the page and reflected at the optical coating 74 which may be inconel. For some types of light sources, more efficient light capture (from source into individual fibers) is possible with the configuration, shown in FIG. 8b, which results from reflecting the configuration, shown in FIG. 8a, in the plane parallel to the axes of the fibers. Even greater illumination efficiency is possible by using a plastic optical fiber (POF) side-emitting source 80 coupled axially into the fiber of array via plastic wave guides 82, as illustrated in FIG. 8c.

Figure 9A:
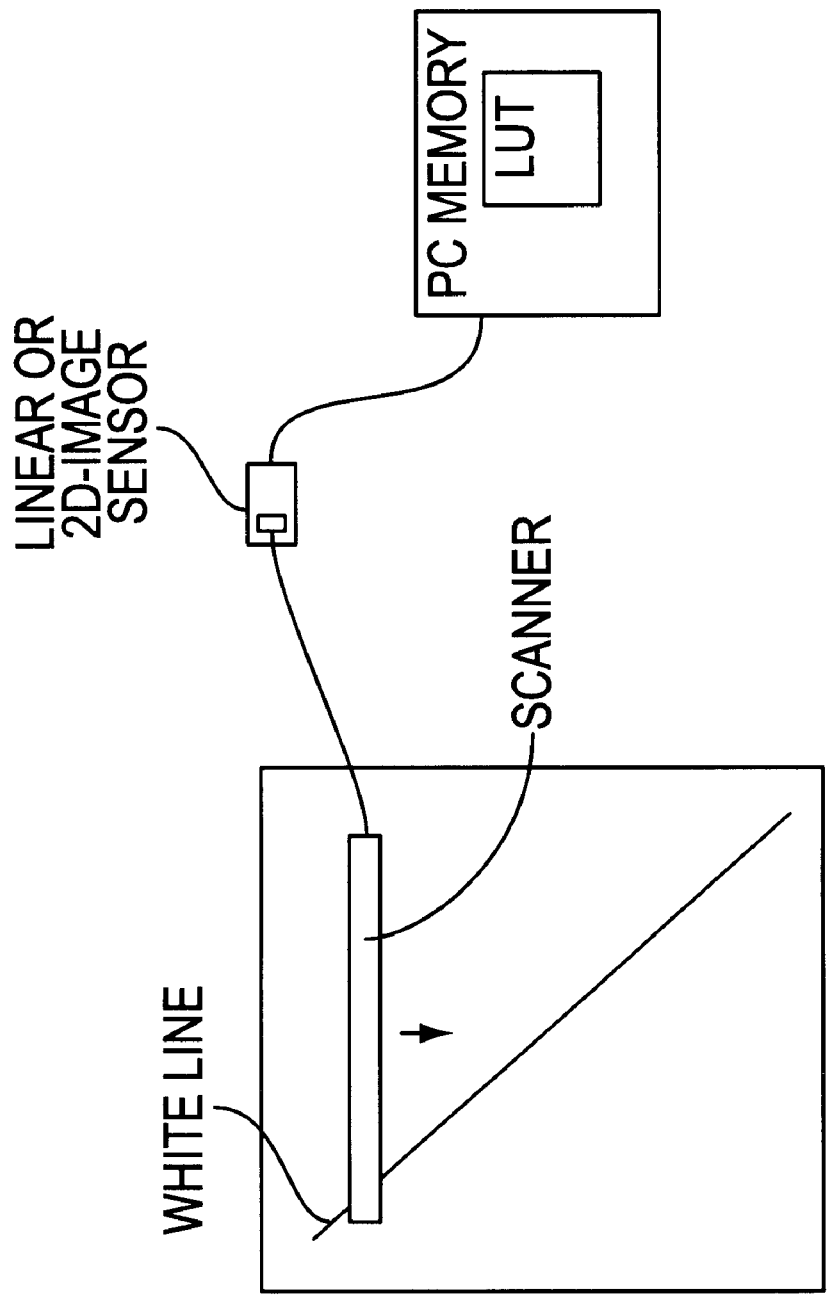
FIG. 9a schematically illustrates the manner in which the scanner may be calibrated.
Figure 9B:
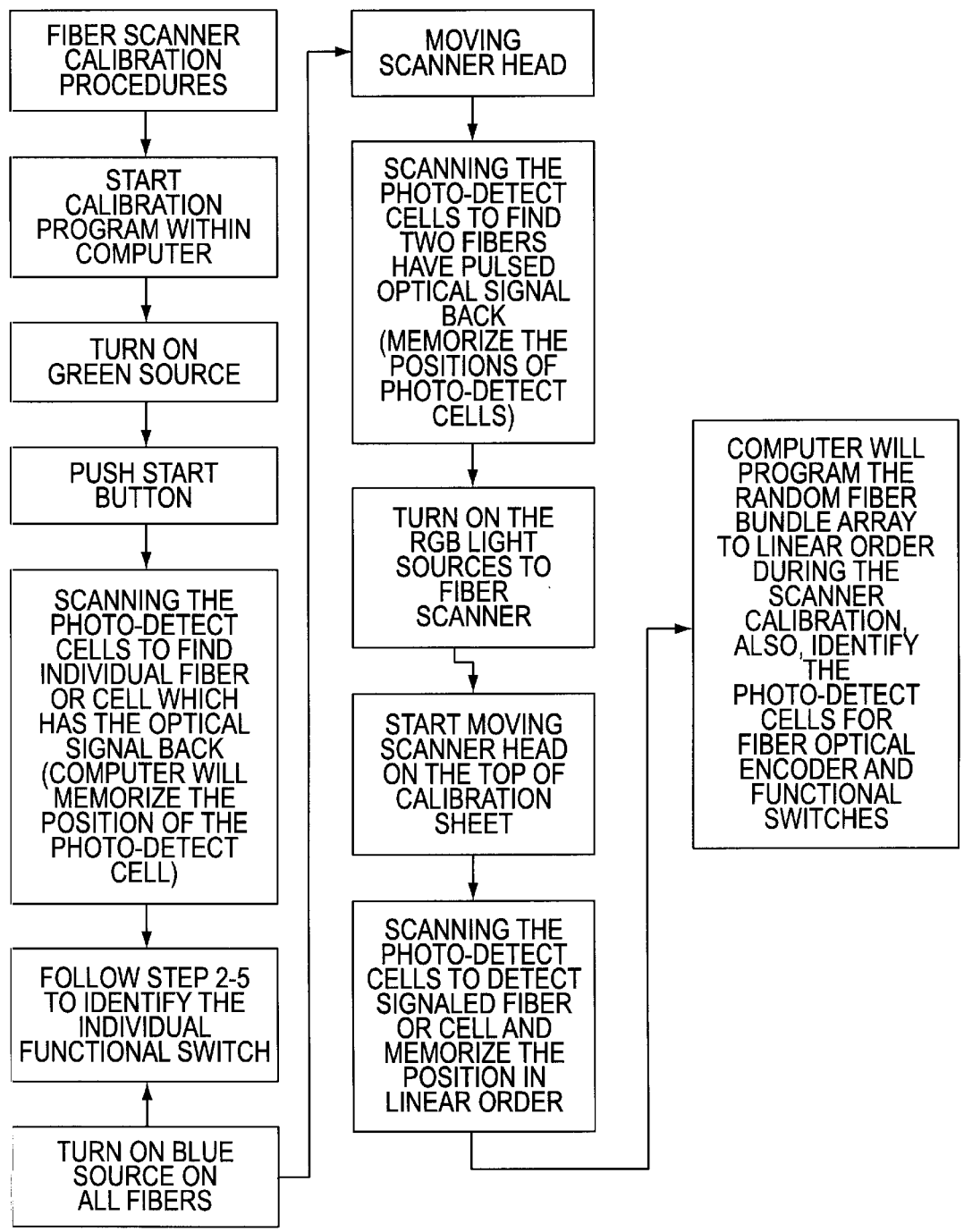
FIG. 9b is a functional block diagram illustrating the details of the calibration procedure.

FIGS. 9a and 9b illustrate the calibration procedure required for each new scanner head to provide information establishing the linear position of each fiber tip within the scanner head array; this information will be stored as a software lookup table, for example, in a configuration EEPROM unique to each scanner electronic module. The scanner head is placed on a test document having thereon a skewed white line. This calibration procedure can easily be performed when the scanner head is detached from its opto-electronic module (PCMCIA) and replaced with another. Then, the pixel number which gives the maximum output is recorded. Then, the scanner is moved along the document in the direction of the arrow and the recording step repeated. Then, there is made a look-up table (LUT) which relates the fiber number to the pixel number.

Figure 10A:
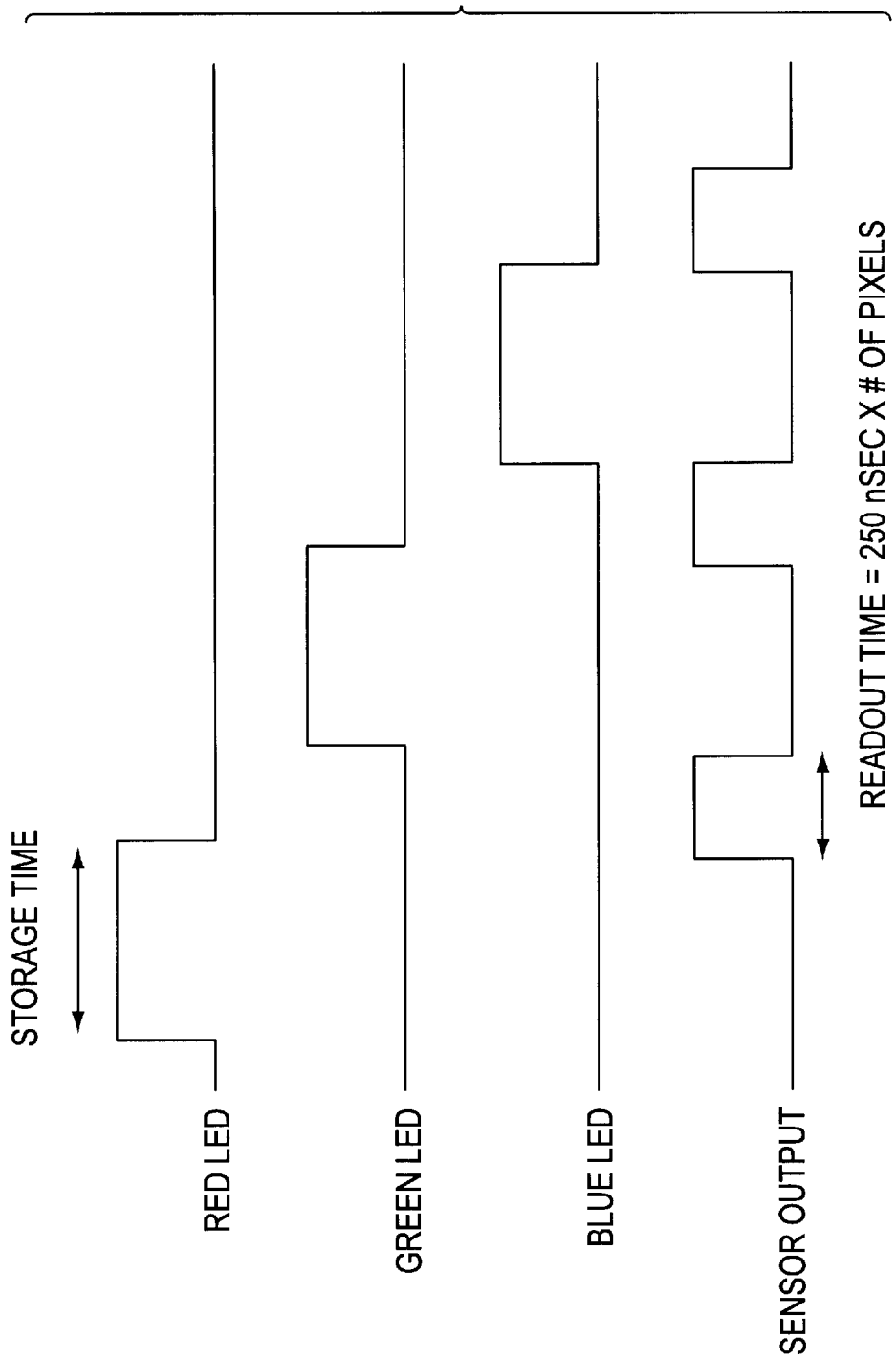
FIG. 10a is a timing diagram illustrating the RGB switching of the LED light sources.
Figure 10B:
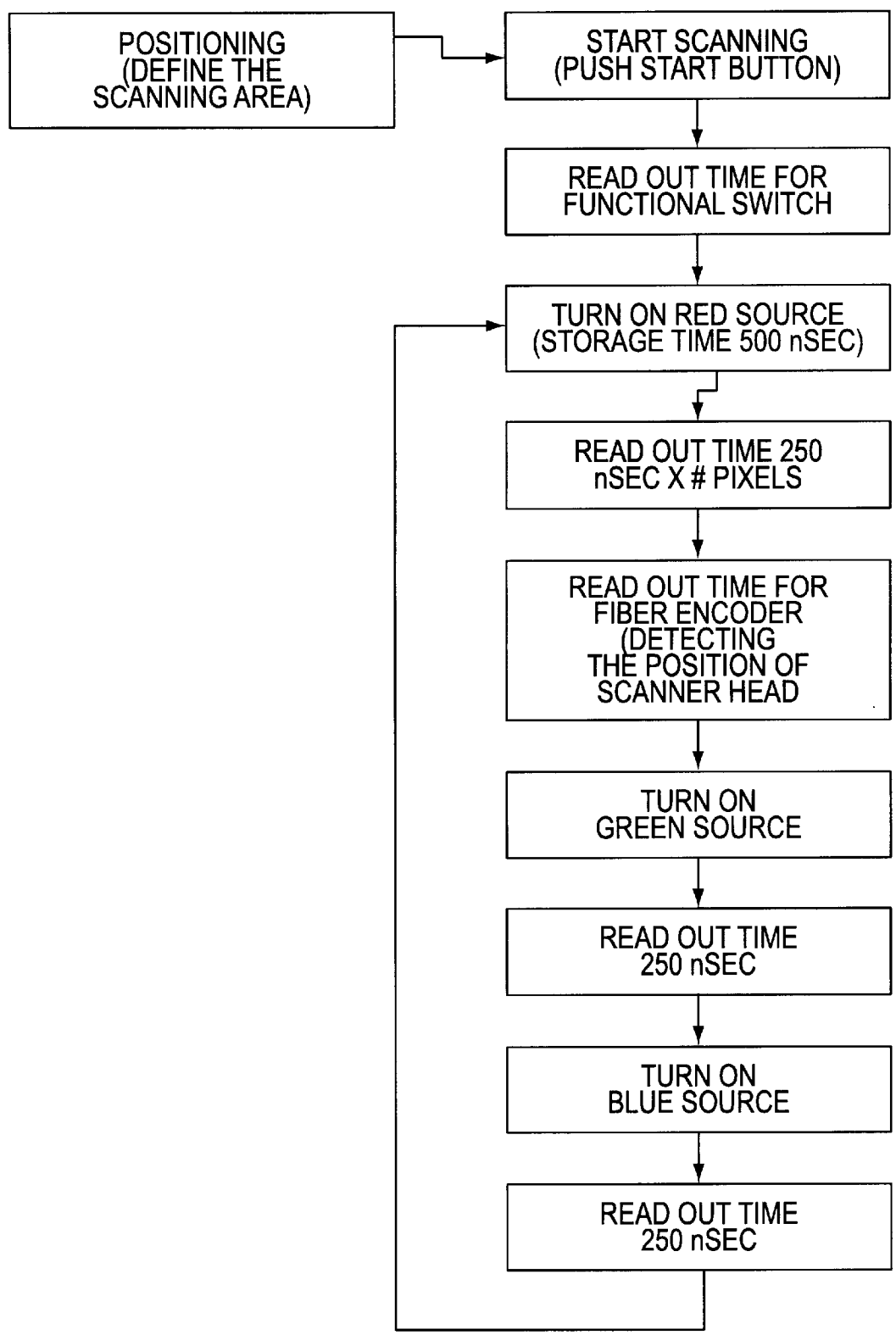
FIG. 10b is a functional block diagram illustrating the switching sequence of the light sources.

FIGS. 10a and 10b are respectively a timing diagram and a functional block diagram for the sequential switching of each three-LED (R,G,B) light source.

Figure 11C:
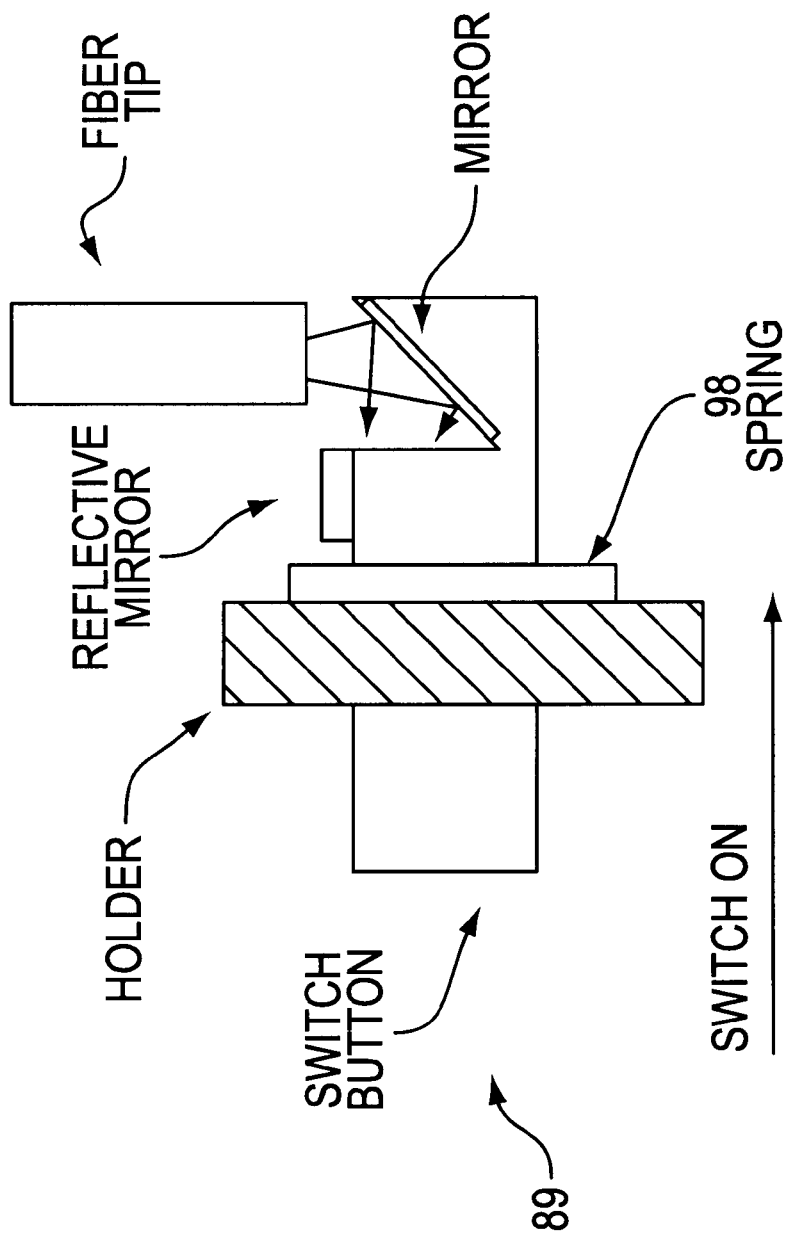

There are three fiber switches 55, 56, 57 at the side of the scanner head. The switching principle is the same for all three switches as shown in FIGS. 11a, 11b and 11c. For example, in FIG. 11a, switch 56 has the push button 56, reflective mirror 90, plastic square bar 92 and the plastic fiber tip 54. FIG. 11a shows the "off" position of the fiber switch 89, the fiber tip 54 delivering the light to a colored plastic button cap 94 through a plastic prism and the clear plastic square bar 92. Thus, in the "off" position, there is a colored light to indicate the individual button for different operation functions. The colors can be generated by either the colored plastic cap or the colored plastic square bar 92. Also, the plastic cap and square bar can be combined into one piece, such as by using injection molding to make the single piece. FIG. 11a and 11c show the "on" position of the switch 89 with the button pushed in. The metal coated mirror 90 on the top of the plastic square bar 92 reflects the light back into the fiber tip 54. The push button is provided with a return spring 98. The reflective mirror may be a thin nylon reflective film with adhesive from 3M or just a flat surface with good finishing (i.e., the plastic square bar itself). In addition to providing the switching function, the mirror also allows the associated fiber to illuminate the button so that the state of illumination of the button is switched from "off" to "on" when the mirror is activated, thereby providing visual feedback (analogous to the tactile feedback provided by a keyboard). There is a 20 dB gain of optical signal feedback between switch "off" and "on". Also, an electronic amplifier with adjustable threshold may be used to detect the photodetector output signal and the output "1" and "0" of the standard TTL signal.

Figure 12A:
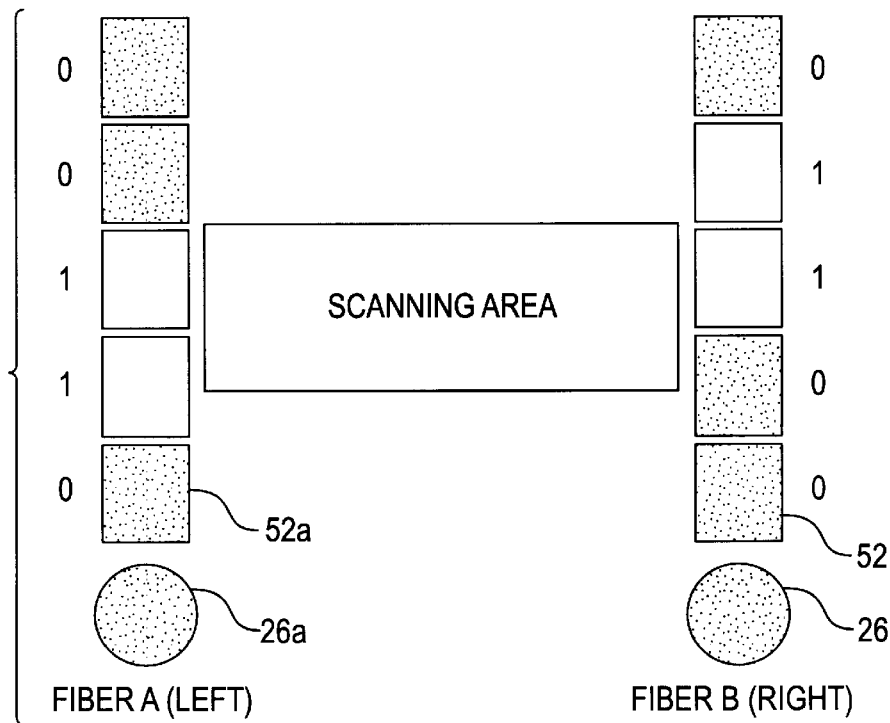
FIGS. 12a and 12b respectively show a grating pattern and a timing chart for the scanner's position-encoder.
Figure 12B:
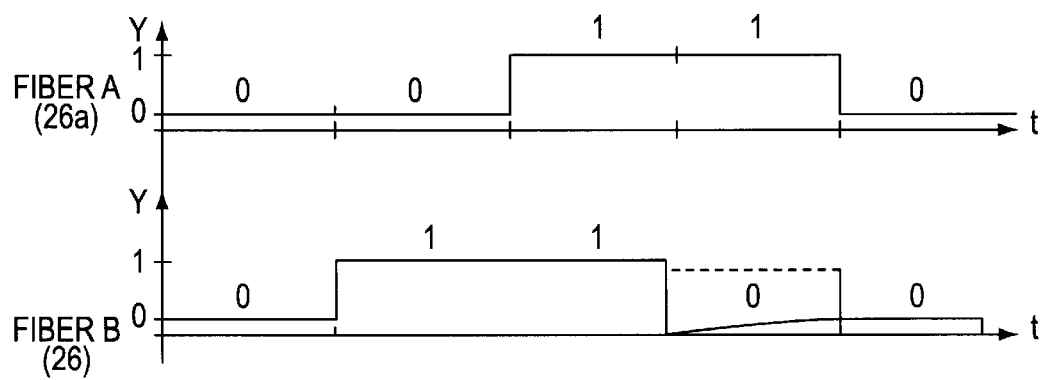

FIGS. 12a and 12b respectively show a grating pattern for the positioning encoder and a timing chart. In FIG. 12a, there are the two separated gratings 52, 52a which are printed as a mask of 100 to 150 microns thickness on the surface of the roller of the encoder (left and right). The Fibers "A" and "B" will pick up reflected light from the surface of the roller to identify the position of the roller and the position of the scanner head. There is a timing signal outputted from the detecting cell to the computer (FIG. 12b). The software driver will detect the scanner moving speed and direction.

Due to the quantum efficiency of O/E converting, the surface reflective efficiency, the scanning speed and the resolution of the scanner, a minimal intensity of light output from the fiber is required; 400 uW/cm2 at 12 cm/s scanning speed and resolution of 200 dpi.

Figure 13:
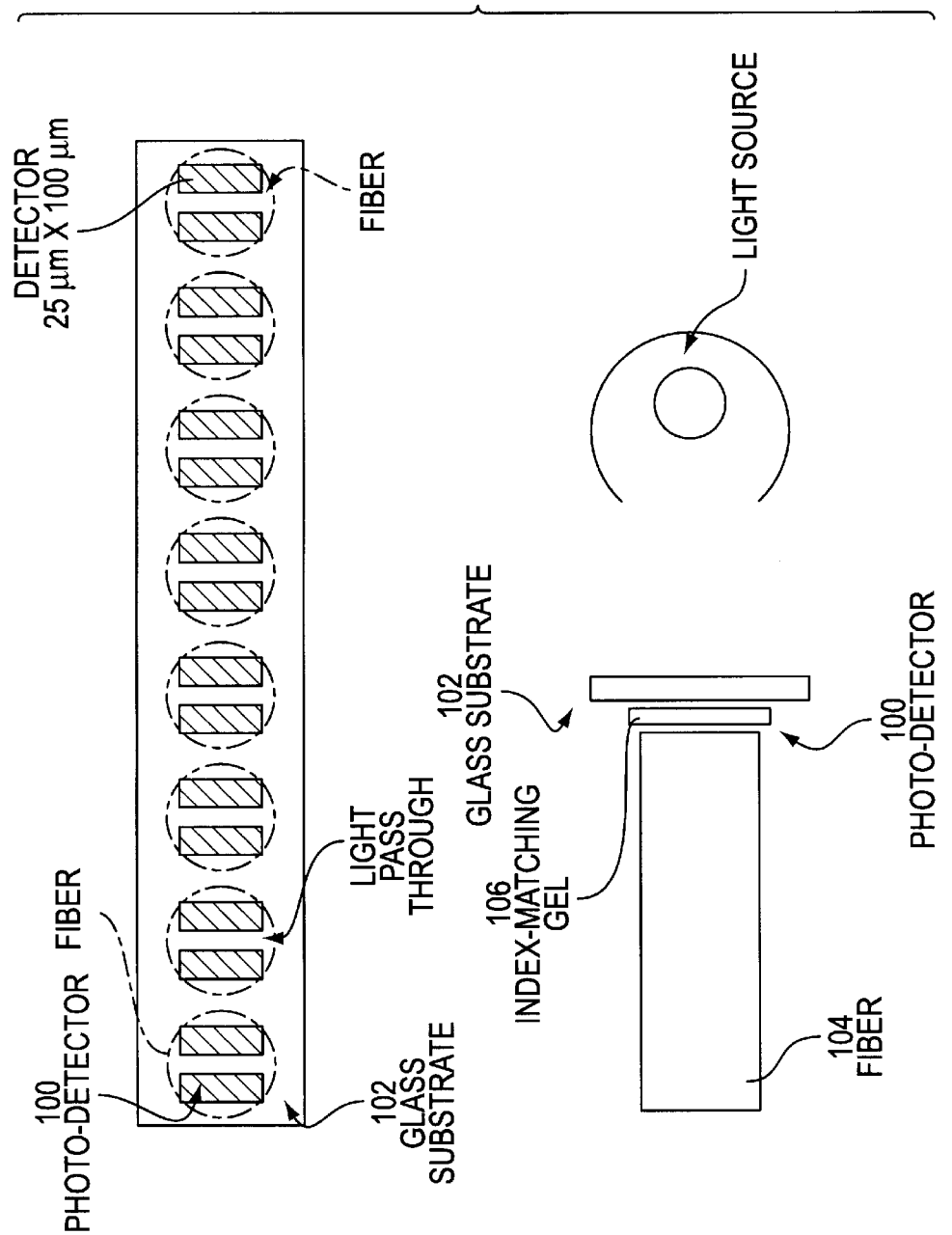
FIG. 13 illustrates back-side coupling of the RGB light sources and a photodetector.

In another embodiment as seen in FIG. 13, a photodetector 100, based on thin-film semiconductor technologies, is formed on the top of a glass substrate 102. The size of the detector is about a 25 $\mu$m×100 $\mu$m strip. The end-polished plastic optical fiber 104 (POF) is aligned on the top of the photodetector. An optical index-matching compound 106 between the plastic optical fiber and the photodetector is used to increase coupling efficiency. The RGB (time-shared, switched) lights pass through the glass windows and couple into the plastic optical fiber 104. The POF delivers RGB lights to illuminate the surface, and also picks up the reflected light that contains the optical information and transmits the reflected light (using the same POF) to the photodetector.

Such an arrangement increases the coupling efficiency between light source and photodetector, increases (for an optical signal) the contrast ratio, and reduces fiber cross talk, and facilitates manufacturing, and reduces detector size.

FIGS. 14–18 illustrate another embodiment of the invention wherein a 2D sensor array is employed.

Figure 14:
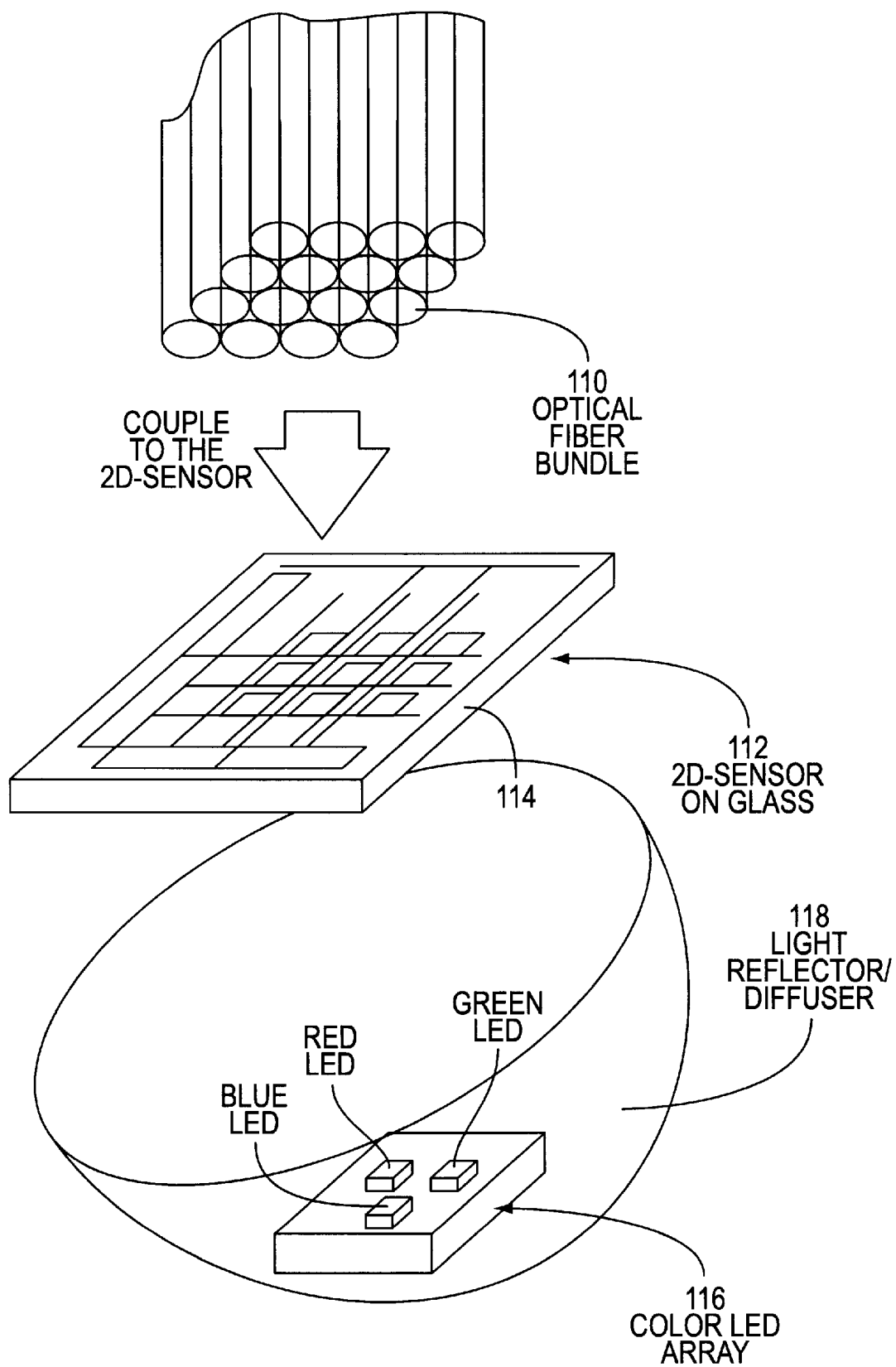
FIG. 14 is a perspective view illustrating the fiber, 2D sensor, and light source coupling.
Figure 15:
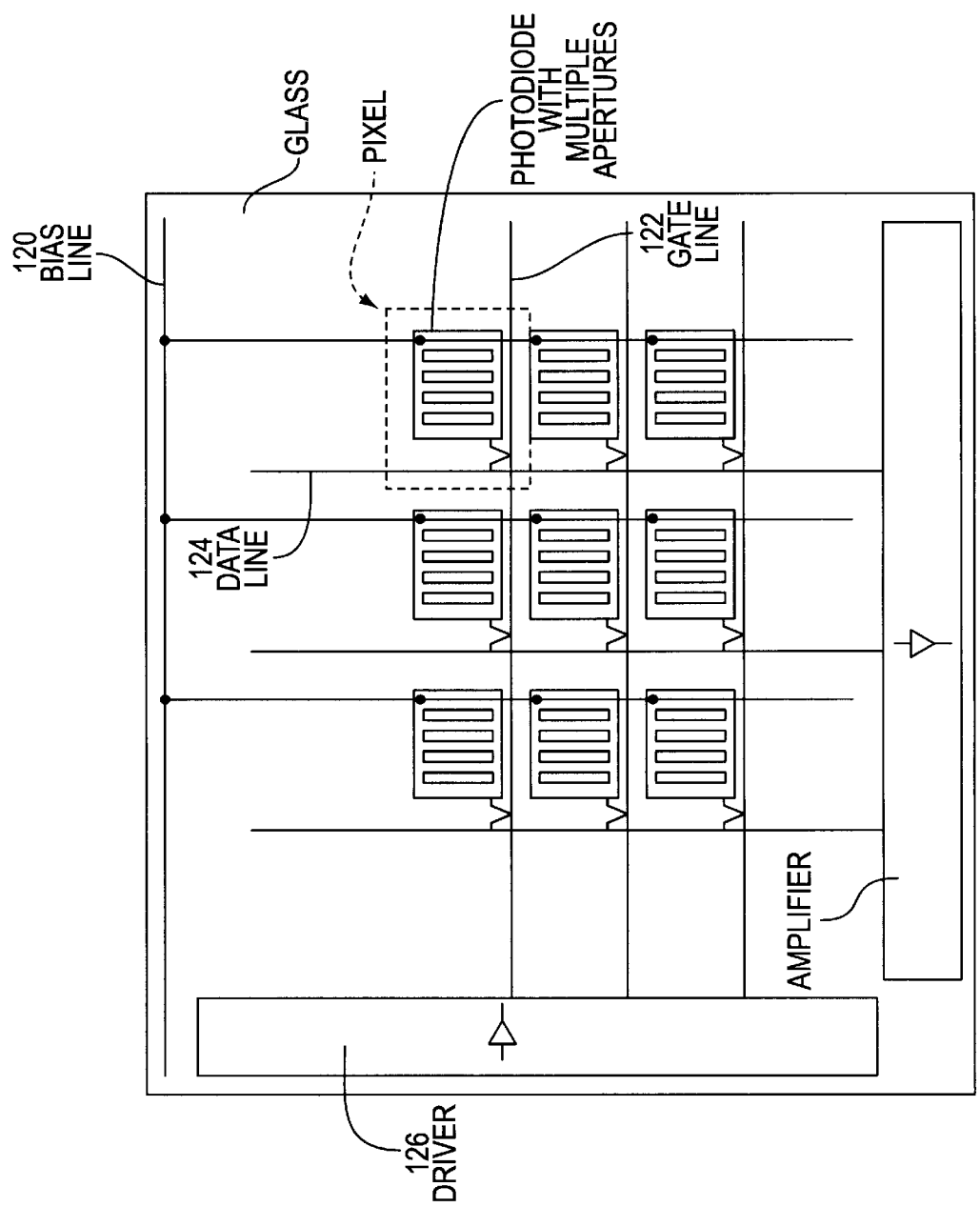
FIG. 15 is a schematic diagram illustrating the configuration of the 2D sensor made by a-Si technology.

FIG. 14 shows an optical fiber bundle 110, a 2D sensor 112, and light source coupling. The image sensor is fabricated on the surface of a glass substrate 114 by amorphous silicon (a-Si) and polycrystalline silicon (poly-Si) technologies. The main components of the sensor are shown in FIG. 15. In FIG. 14, the fiber bundle 110 is closely coupled to the 2D-sensor 112 with some optical grease or gel. It is better to use end-polished fibers with small numerical apertures, because the light does not spread after leaving the fiber end and reaching the sensitive part of the sensor. Otherwise, this light cross-talk can degrade the spatial resolution of the scanner system. In FIG. 14, the light source consists of a tri-color LED array 116 and a reflector or diffuser 118. The LED array has at least one LED for each of the red, green and blue colors. The cone-shaped light reflector/diffuser 118 efficiently directs the light emitted by the source 116 toward the 2D-sensor 114. Hence, the light intensity at the bottom of the sensor 114 in FIG. 14 becomes substantially uniform.

The operation of the device is as follows. The light emitted by the source 116 reaches the bottom of the sensor 114 and is partially transmitted to the fiber bundle 110. How the light is partially transmitted will be explained in the connection with FIG. 15. The transmitted light enters the fiber bundle 110 and is transferred inside the fibers. At the scanner head, the light emerges from the fiber and irradiates a document. The reflected light comes back in the same fiber because the fiber end is very close to the document (this distance is less than the fiber diameter). This light is transferred inside the fiber, and emerges at the other end, and is detected by the sensitive part of the photodiodes.

FIG. 15 is a schematic diagram showing the configuration of the 2D-sensor made by a-Si technology. A picture element, or pixel, consists of an a-Si photodiode and a thin film transistor (TFT). These pixels are arranged two-dimensionally and are operated by the electrical signals supplied by the driver circuit and fed to the amplifier circuit. There are three kinds of global lines which address each pixel. These are a bias line 120, gate line 122 and a data line 124. The bias line 120 is connected to one electrode of the photodiode and is used to apply a fixed potential of about 5V to each photodiode. The gate line 122 connects each output of a driver circuit 126 to all the gate electrodes of the TFTs in a row. The data line 124 connects an input of an amplifier to the drain electrodes of all the TFTs in a column.

The 2D-sensor configuration explained so far is a standard one. For example, it is described by R. A. Street, et al, in "Page-sized amorphous silicon image sensor arrays," Proc. SPIE Vol. 1990, pp. 135–146 (1993).

Photodiodes with multiple apertures as shown in the drawing can be achieved by the standard semiconductor fabrication process during the course of the sensor fabrication. The apertures are not mandatory because the space between the adjacent photodiodes can transmit light, but the spatial resolution is higher if there are apertures in the photodiodes.

Other features of the photodiode are standard and well known. For example, the bottom electrode of the photodiode is an opaque material such as Cr. The top electrode is a transparent material, such as ITO (indium tin oxide). The photosensitive material, in this case, a-Si, is sandwiched between these electrodes. Therefore, the photodiode can detect light landing from the top (coming from the fiber bundle 110 in FIG. 14) only, but it is not sensitive to the light coming from the bottom.

FIG. 16 is a cross-section of the fiber bundle. The fibers are bundled randomly, so that the above-described calibration process is used, as shown in FIGS. 9a and 9b.

FIG. 17 shows the spatial positioning of the fibers and the 2D-array of photodiodes. It can be seen that each fiber is coupled to at least one photodiode, and in many cases, it is coupled to many nearby photodiodes. When each fiber transmits light, photodiodes produce electrical output signals. Depending on the extent of the photodiode area covered by the fiber, output amplitudes from these pixels are different. Therefore, there is always one pixel which yields the maximum signal amplitude. Even though FIG. 17 shows a CCD with pixels which appear to be approximately the same size as a fiber diameter, in practice a CCD detector will have a pixel size on the order of 10 to 20 $\mu$m; thus, with a fiber diameter of 114 $\mu$m, many CCD pixels (as many as 100) will be illuminated by each fiber, and the computer will sum the outputs of all the pixels to determine the illumination of the fiber. Based on this information, a look-up table between the fiber numbers and the pixel numbers is obtained.

Figure 18:
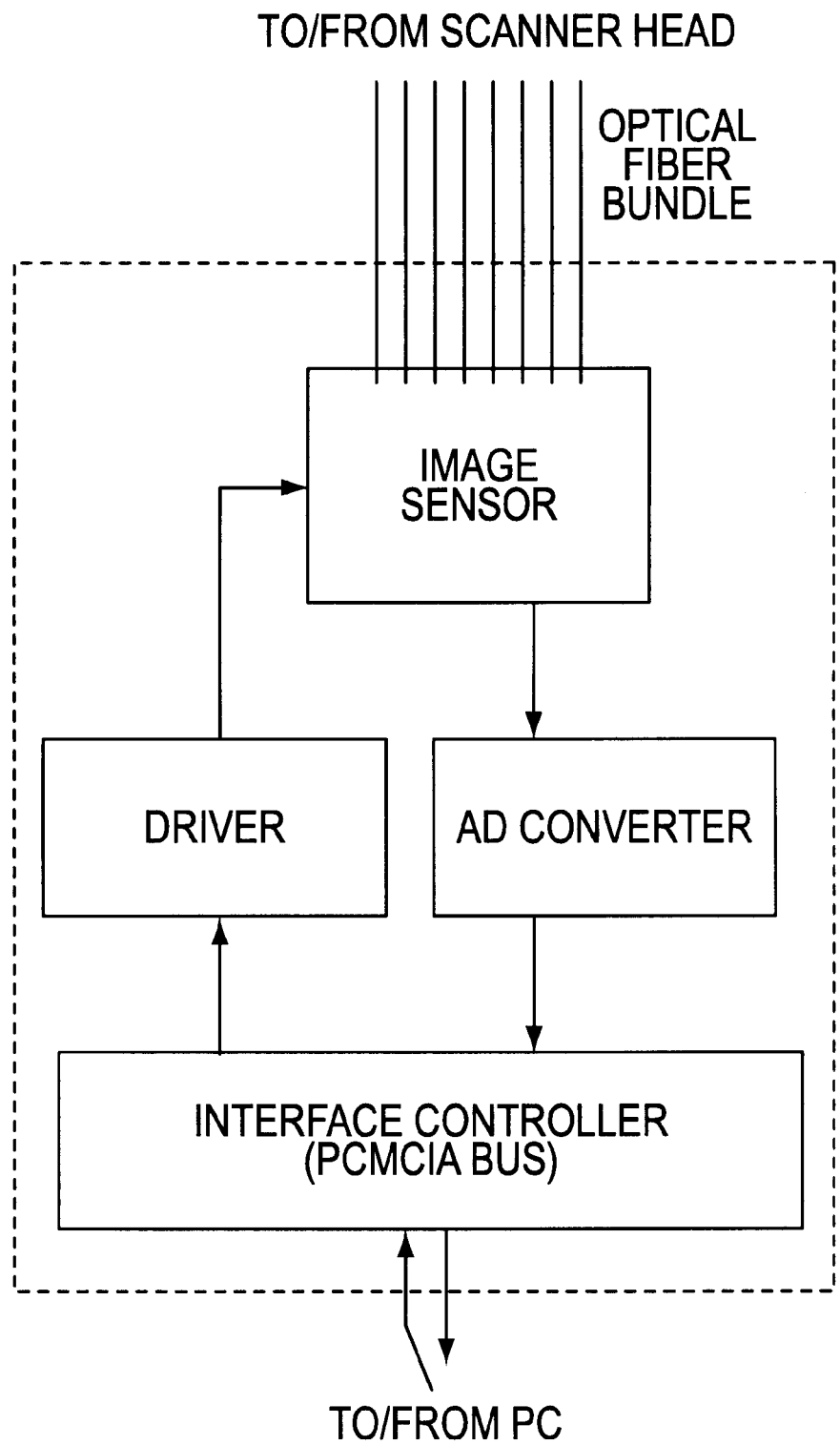
FIG. 18 is a functional block diagram illustrating the components needed for controlling the scanner.

FIG. 18 is a block diagram showing the components needed for controlling the device (and is also applicable to the linear embodiment). An image sensor is driven by a signal created by a PC. The output analog signal is converted into a digital signal and is transferred to the PC.

While only preferred embodiments of the invention have been described above, other embodiments and variations will be obvious to persons of obvious skill in the arts to which the invention pertains; thus, the invention is limited only by the scope of the appended claims.

What is claimed is:

1. An optical scanner for scanning and reading a color image formed on a surface, comprising:

a hand-held scanner head;

an optoelectronic module, separate from said scanner head, and located at a distance from said scanner head, for converting impinging light signals to electrical signals;

light source means, separate from said scanner head and located at a distance therefrom, for generating red, blue and green light beams; and a bundle of individual plastic optical fibers extending from said scanner head to said optoelectronic module and to said light source means, first ends of said optical fibers being secured in said scanning head and arranged in a linear array for scanning the color image upon movement of said hand-held scanner head, opposite ends of said optical fibers being coupled to said optoelectronic module and to said light source means, whereby a light beam is transmitted from said light source means via a given fiber to said surface, is reflected from the image thereon, and is returned via said same given fiber to said module to produce electrical signals representative of the scanned image.

2. The optical scanner as defined in claim 1, wherein each fiber has a side-coupler for receiving the transmitted light beam.

3. The optical scanner as defined in claim 1, wherein said scanner head carries an all-optical encoder for determining the movement of the scanner head and the position of the scanner head relative to the surface.

4. The optical scanner as defined in claim 3, wherein said scanner head carries all-optical fiber switches for controlling the scanning and position-encoding operations of the scanner, and for controlling ON/OFF operation of the scanner.

5. The optical scanner as defined in claim 1, wherein said opto-electronic module comprises multi-apertured photodiodes for converting optical signals to electrical signals.

6. The optical scanner as defined in claim 5, wherein the photodiodes are formed in a 2D array on a transparent glass substrate.

7. The optical scanner as defined in claim 1, wherein said optical electronic module comprises a linear array of photodetectors.

8. The optical scanner as defined in claim 1, wherein the first and opposite ends of the optical fibers are randomly disposed relative to each other.

9. The optical scanner as defined in claim 1, wherein said optoelectronic module comprises a plurality of photodetectors, and wherein said optical scanner further comprises computer means for correlating the respective first and opposite ends of each fiber, and for assigning each fiber to one or more detector pixels, where the pixel subsets assigned to individual fibers are disjoint.

10. The optical scanner as defined in claim 1, wherein a center portion of each fiber is thinner than the tips of the fiber, thereby providing increased flexibility to the fiber bundle.

11. An all-optical hand-held scanner head for use in a color image scanning system including light detecting means for detecting image light signals reflected from the image when the image is irradiated with transmitted colored light signals, said scanner head comprising:

an extended housing having a scanning surface;

a bundle of elongated optical fibers mounted in said housing, and having respective optical fiber tips exposed at said scanning surface, each of said optical fibers having an optical side coupling for inputting the transmitted colored light signals;

optical rotary encoder means, mounted on said housing, for reflecting coded light signals indicative of the displacement of said scanner head along said image; and manually operated optical fiber switch means, mounted in said housing, for reflecting function-defining light signals, a first set of said optical fiber tips being linearly disposed along the length of said scanning surface, and being dedicated to scanning the image by directing the transmitted colored light signals to said image and returning corresponding said reflecting image light signals via said bundle to the light detecting means, a second set of said optical fiber tips being dedicated to said rotary encoder means for directing the transmitted coded light signals to said rotary encoder means and returning the reflected coded light signals via said bundle to said light detecting means, and a third set of said optical fiber tips being dedicated to said optical fiber switch means for directing the transmitted colored light signals to said optical fiber switch means and returning the reflected function-defining light signals via said bundle to said light detecting means, wherein corresponding transmitted and reflected light signals travel in opposite directions in the same optical fiber.

12. The scanner head as defined in claim 11, further comprising a protective layer covering said optical fiber tips.

13. The scanner head as defined in claim 12, wherein the protective layer is a transparent silica coating having a thickness of approximately 12 $\mu$m.

14. The scanner head as defined in claim 12, wherein the protective layer is a transparent glass layer having a thickness of approximately 100 to 150 $\mu$m.

* * * * *